United States Patent [19]

Shida et al.

[11] 4,263,171

[45] Apr. 21, 1981

[54] POLYMERIZATION CATALYST

[75] Inventors: Mitsuzo Shida, Barrington; Thomas J. Pullukat, Hoffman Estates; Raymond E. Hoff, Palatine, all of Ill.

[73] Assignee: Chemplex Company, Rolling Meadows, Ill.

[21] Appl. No.: 63,111

[22] Filed: Aug. 1, 1979

[51] Int. Cl.³ ............................ C08F 4/02; C08F 4/64; C08F 4/68
[52] U.S. Cl. ........................... 252/429 C; 252/429 B; 526/129; 526/156; 526/151
[58] Field of Search ............ 252/429 B, 429 C, 431 R

[56] References Cited

U.S. PATENT DOCUMENTS

| | | | |
|---|---|---|---|
| 3,094,568 | 6/1963 | Hay et al. | 252/429 B X |
| 3,787,384 | 1/1974 | Stevens et al. | 252/429 C X |
| 3,962,204 | 6/1976 | Matsuura et al. | 252/429 C X |
| 4,004,071 | 1/1977 | Aishima et al. | 252/429 C X |
| 4,063,009 | 12/1977 | Ziegler et al. | 526/159 |
| 4,081,589 | 3/1978 | Peters et al. | 526/97 |
| 4,097,409 | 6/1978 | Speakman | 252/429 C X |
| 4,097,659 | 6/1978 | Creemers et al. | 252/429 C X |
| 4,113,933 | 9/1978 | Schweier et al. | 252/429 C X |
| 4,173,547 | 11/1979 | Graff | 252/429 B |

FOREIGN PATENT DOCUMENTS

| | | |
|---|---|---|
| 2209874 | 10/1972 | Fed. Rep. of Germany . |
| 2232685 | 1/1973 | Fed. Rep. of Germany . |
| 1484254 | 9/1977 | United Kingdom . |

OTHER PUBLICATIONS

Ziegler et al., *Ann. der Chemie*, vol. 605 (1957), pp. 93–97.

*Primary Examiner*—Patrick Garvin
*Attorney, Agent, or Firm*—Wegner, Stellman, McCord, Wiles & Wood

[57] ABSTRACT

An olefin polymerization and copolymerization catalyst active in the presence of an alkyl aluminum cocatalyst is prepared by mixing, in the presence of a solvent, particles of a silica or alumina material having reactive surface groups, and a complex of the general formula $(MgR_2)_m(AlR_3')_n$ where R and R' are alkyl groups and m/n is between about 0.5 and 10, inclusive, to form a hydrocarbon insoluble reaction product which is then mixed, in the presence of a solvent, with a titanium, vanadium or zirconium halide, oxyhalide or alkoxyhalide, followed by evaporation of the solvent.

21 Claims, No Drawings

POLYMERIZATION CATALYST

BACKGROUND OF THE INVENTION

The titanium catalyst of this invention is highly active and is suitable for polymerization of ethylene and other 1-olefins, particularly of 2-8 carbon atoms, and copolymerization of these with 1-olefins of 2-20 carbon atoms, such as propylene, butene and hexene, for example, to form copolymers of low- and medium-densities. It is equally well suited for particle form and gas phase polymerization processes, and is especially effective in the selective production of high-density polyethylene having a narrow molecular weight distribution and high melt index for injection molding applications. The catalyst is also well suited for the production of high-strength fibers or film having a low melt index.

The catalyst does not require an excess of titanium and therefore obviates the need for removal of catalyst residues from product polymer. The catalyst is suitable for use in particle form polymerization plants designed for prior silica-supported chromium oxide catalysts. Heretofore, titanium catalysts have not been extensively used in such plants due to the substantial excess of corrosive titanium compounds typically used in the preparation of such catalysts. The present catalyst is easily injected into particle form reactors by means of well known automatic feeding valves, and corrosion-resistant materials of construction are not required.

SUMMARY OF THE INVENTION

The improved catalyst of the invention is prepared by combining, in the presence of a solvent, a magnesium-aluminum complex of the general formula $(MgR_2)_m(AlR_3')_n$ with pre-activated particles of an inorganic oxide material having reactive groups. These reactive groups may be hydroxyls and/or oxide linkages or similar surface groups. The reaction product thereby produced is then reacted, in the presence of a solvent, with a halogen-containing transition metal compound to form a supported catalyst component, followed by evaporation of the solvent. The catalyst component prepared according to the foregoing is active in the presence of an effective quantity of an alkyl aluminum cocatalyst, preferably comprising a trialkyl aluminum compound.

The inorganic oxide material is chosen from the group consisting of silica, alumina and silica-alumina. The inorganic oxide material is utilized in finely divided form and is preactivated by heating in an inert atmosphere at temperatures of up to about 900° C.

The magnesium-aluminum complex is of the general formula $(MgR_2)_m(AlR_3')_n$ where R and R' are alkyl groups and m/n is between about 0.5 and 10, inclusive. R and R' may be the same or different alkyl groups of up to about 12 carbon atoms.

The transition metal compound is of the general formula $Tr(OR)_aX_{4-a}$ or $TrOX_3$ wherein Tr is a transition metal selected from the group consisting of titanium, vanadium and zirconium, R is an alkyl group of less than about 20 carbon atoms, X is a halogen atom and a is zero or an integer less than 4. Titanium compounds are preferred for highest reactivity.

The transition metal compound is reacted with the reaction product of the magnesium-aluminum complex and the inorganic material, preferably in equimolar ratio, so that the resultant solid catalyst component incorporates substantially all of the titanium in a highly active form. It is therefore unnecessary to remove non-reactive titanium from the catalyst or from product polymer, as opposed to prior titanium catalysts which require excessive titanium during preparation.

The catalyst is, because of its high activity, equally well suited for use in the particle form polymerization process in which the solid catalyst component, the cocatalyst, and olefin monomer are contacted in a suitable solvent, such as the solvent used in the catalyst forming reaction, or in a gas phase process in which no solvent is necessary.

Product polymer melt index (MI) is readily controlled by polymerization temperature control, or by hydrogen addition. Due to the catalyst's high activity, a relatively high partial pressure of hydrogen may be used in order to result in a high product melt index. Also, the catalyst's high activity makes feasible copolymerization of olefins less reactive than ethylene.

DESCRIPTION OF THE PREFERRED EMBODIMENTS

I. Preparation of the Inorganic Oxide Material

The reaction product catalyst of the invention is formed and is bonded to the surface of the inorganic oxide materials by reaction with active surface hydroxyl or oxide groups thereof. Polymerization reaction efficiency is dependent, to some extent, upon the physical characteristics, such as surface area, of the inorganic oxide material. Therefore, it is preferred to utilize the inorganic oxide material in finely divided form. The amount of titanium compound is determined with respect to the amount of magnesium-aluminum complex, within limits.

Suitable inorganic oxide materials include silica, alumina and silica-alumina, with silica being preferred. The inorganic oxide may contain small amounts of materials such as magnesia, titania, zirconia and thoria, among others.

It is necessary to dry and preactivate the inorganic oxide material by heating in an inert atmosphere at an elevated temperature before contact with the magnesium-aluminum complex. In the case of Davison Chemical Company Grade 952 silica, optimum catalyst reactivities are obtained at an activation temperature of about 600° C. in a nitrogen atmosphere, although satisfactory results are obtained at temperatures between about 200° C. and 900° C.

II. Catalyst-Forming Reactants

1. Magnesium-aluminum Alkyl Complex

Particles of the dried and preactivated inorganic oxide material are initially reacted with an organomagnesium-aluminum complex of the general formula $(MgR_2)_n(AlR_3')_n$ in which R and R' are the same or different alkyl groups and the ratio m/n is within the range of about 0.5 to about 10, and preferably between about 2 and 10.

The alkyl groups R bonded to the magnesium atom may be the same or different, and each has between 2 and 12 carbon atoms. When the R groups are identical, it is preferred that each has at least 4 carbon atoms, and are preferably butyl or hexyl groups. The alkyl groups R' are preferably ethyl groups.

The reaction between the magnesium-aluminum complex and the inorganic oxide particles is carried out in a solvent, preferably at room temperature for convenience. The catalyst-forming reactions may be carried out at higher or lower temperatures, if desired.

The amount of the magnesium-aluminum complex is chosen such that the total number of moles of magnesium and aluminum is between about 0.1 to 10 times the number of moles of transition metal, the amount of which is chosen with reference to the weight of inorganic oxide, as is described below. It is preferred that magnesium and aluminum be present in equimolar ratio to the transition metal compound.

The magnesium-aluminum complex is known in the art, as disclosed in Aishima et al. U.S. Pat. No. 4,004,071 (Jan. 18, 1977) at col. 2, 11. 34-40 and col. 3, 11. 30-36. The complex is readily prepared according to the teachings of Ziegler et al., Organometallic Compounds XXII: Organomagnesium-Aluminum Complex Compounds, *Annalen der Chemie,* Vol. 605, pages 93-97 (1957).

2. Transition Metal Compound

After the inorganic oxide particles are completely reacted with the organomagnesium-aluminum complex, a selected halogen-containing transition metal compound is reacted with the resulting hydrocarbon insoluble reaction product to form an active solid catalyst component. The catalyst-forming reaction is carried out in a solvent, preferably a hydrocarbon, and preferably at room temperature.

The transition metal compound is selected from those of the general formula $Tr(OR)_aX_{4-a}$ or $TrOX_3$ wherein Tr is titanium, vanadium or zirconium, R is an alkyl group of less than about 20 carbon atoms, X is a halogen atom and a is zero or an integer less than 4. Suitable transition metal halides include $TiCl_4$, $Ti(OR)Cl_3$, $Ti(OR)_2Cl_2$, $Ti(OR)_3Cl$, $VOCl_3$, $VCl_4$, $ZrCl_4$ and others commonly used in conventional Ziegler catalysts.

For optimum reactivity, the transition metal is added to the inorganic oxide-magnesium-aluminum complex reaction product in equimolar ratio to the total magnesium and aluminum present. For each mole of organomagnesium-aluminum complex, the number of moles of transition metal should equal m+n.

The ratio of transition metal compound with respect to the inorganic oxide material may vary over a relatively wide range, although it has been found that the best results are obtained with a transition metal content of between about 0.25 and 1.0 mmoles per mmole of active surface hydroxyl and oxide groups on the inorganic oxide material. Preferably, between 0.6 and 2.5 mmoles of transition metal compound should be added to the reaction mixture per gram of inorganic oxide material.

III. Solvent Evaporation

After formation of the solid catalyst component by reaction of the transition metal compound with the inorganic oxide-magnesium-aluminum complex reaction product, the solvent present in the catalyst-forming reaction must be evaporated under an inert atmosphere. For example, evaporation may occur at a temperature between about 90° C. and 100° C. under a nitrogen atmosphere for from about ½ to 10 hours, or until dry. Solvent evaporation is necessary to ensure that product polymer is formed in small particles suitable for a particle form process rather than in sheets, fibers or chunks which rapidly foul the reactor and decrease reaction efficiency.

After solvent evaporation, the catalyst may advantageously be added to a solvent for reaction therein, as in the particle form polymerization process. The solvent added to the catalyst may be the same solvent used in the catalyst forming reaction, if desired, or may be any other suitable solvent. The catalyst exhibits no loss in activity due to addition to solvent.

Further, it has been found that although solvent evaporation is most typically carried out at an elevated temperature, it is evaporation and not heating which ensures desirable product characteristics. Evaporation may be carried out, if desired, at reduced pressure and temperature.

IV. Cocatalyst

The catalyst prepared as described above is active in the presence of an alkyl aluminum cocatalyst. Trialkyl aluminum compounds such as triisobutyl aluminum (TIBAL) are preferred cocatalysts. The alkyl aluminum compound is fed to the polymerization reaction zone separately from the solid catalyst component.

The proportion of cocatalyst to solid catalyst component may be varied, depending on the transition metal concentration in the solid catalyst component. In the case of TIBAL, excellent results have been obtained with as low as 4.6 mmole cocatalyst per gram of solid catalyst component.

V. Reaction Conditions

The particle form reaction system is characterized by the introduction of monomer to an agitated catalyst-solvent slurry. The solvent, typically isobutane, may be the solvent in which the catalyst preparation reaction is carried out. This type of reaction is best carried out in a closed vessel to facilitate pressure and temperature regulation. Pressure may be regulated by the addition of nitrogen and/or hydrogen to the vessel. Addition of the latter is useful for regulation of the molecular weight distribution and average molecular weight of product polymer, as is well known in the art.

Particle form polymerization of ethylene with the catalyst of this invention is best carried out at about 105° C. to 110° C. at a pressure of between 35 and 40 atmospheres. In gas phase polymerization, the temperature may range from less than about 85° C. to about 100° C. with a pressure as low as about 20 atmospheres. Copolymers may be produced by either process by addition of propylene, butene-1, hexene-1 and similar alpha olefins to the reactor. Production of copolymers of relatively low density is preferably carried out at a relatively low temperature.

EXAMPLE 1

A quantity of Davison Chemical Company Grade 952 silica was dried by heating at 600° C. for five hours in a fluidized bed with nitrogen flow. A 2.2 g portion of the dried silica was transferred to a flask and stirred with a magnet bar without exposure to the atmosphere. The flask was kept free of oxygen and water vapor by maintaining a flow of pure nitrogen through the flask to a mercury-filled bubbler.

After one hour of nitrogen flow at room temperature, the flask was cooled in an ice bath to about 0° C. During stirring of the silica, 13.8 ml of a heptane solution of an organomagnesium-aluminum complex was added. The complex had the formula $\{(C_4H_9)_2Mg\}_{6.5}\{(C_2H_5)_3Al\}$, and the concentration was 0.51 M in dibutylmagnesium and 0.078 M in triethylaluminum. The silica/complex solution mixture was stirred at 0° C. under nitrogen for 30 minutes, and 0.75 ml (6.7 millimoles) of titanium tetrachloride was added.

After an additional 30 minutes of mixing at 0° C., the flask was placed in a silicone oil bath at 90° C. and dried under continuous nitrogen flow for 30 minutes. The result was a dark brown free-flowing powder.

A series of polymerization activity tests was conducted with the above-described catalyst in isobutane. The pressure vessel was maintained at 221° F. prior to and during each test, and under continuous nitrogen purge prior to each test. In each test, an amount of the catalyst was introduced to the pressure vessel, followed by a volume of TIBAL solution. The entry port to the vessel was then closed, and the nitrogen purge stopped. Isobutane was then added to the vessel, and a mixer was activated.

After the addition of the isobutane, ethylene and a desired partial pressure of hydrogen were introduced to the reactor. Total pressure was maintained at 550 psig with ethylene during the reaction. Temperature was maintained at 221° F. by means of a cooling jacket, reflux condenser, and pressure regulator. In each case, small particles of polyethylene suitable for a particle form process were produced. The polymerization test results are shown in Table I.

TABLE 1

| | | Example 1 | | | | |
|---|---|---|---|---|---|---|
| Test No. | Catalyst Wt. (mg) | Cocatalyst Amount (mmole/g) | Hydrogen (psig) | Reactivity g/g of Ti/hr. | g/g of catalyst/hr. | Melt Index* |
| 1 | 20.3 | 9.2 | 50 | 146,000 | 10,540 | 0.24 |
| 2 | 6.4 | 9.2 | 50 | 143,000 | 10,300 | — |
| 3 | 5.1 | 4.6 | 50 | 125,000 | 9,020 | — |
| 4 | 30.9 | 9.2 | 100 | 114,000 | 8,200 | 1.10 |

*ASTM D-1238 52T

EXAMPLE 2

Another catalyst was prepared following the procedure of Example 1, except that the silica was dried at 850° C. Polymerization tests were performed as described in Example 1 and particles of polyethylene were produced. Results of the tests are given in Table II.

EXAMPLE 3 (COMPARATIVE EXAMPLE)

This example demonstrates that catalyst reactivity is decreased if a substantially pure dialkyl magnesium compound is substituted for the organomagnesium-aluminum complex. The catalyst preparation and polymerization test procedures were the same as in Example 1, except that the silica was dried at 850° C., and butyl ethyl magnesium was substituted for the organomagnesium-aluminum complex. The butyl ethyl magnesium solution contained a small quantity of aluminum compound. However, the molar ratio of magnesium to aluminum was 66, as opposed to the Mg/Al ratio of 6.5 in Examples 1 and 2. Results of the polymerization tests are given in Table II.

EXAMPLE 4 (COMPARATIVE EXAMPLE)

This example demonstrates that there is no advantage in treating silica with an excess of the organomagnesium and titanium compounds, and washing the composition after each such treatment.

2.0 grams of Davison Grade 952 silica were dried at 850° C. as described in Examples 1 and 2 and was introduced to, and stirred for one hour in, a flask under a nitrogen purge at all times. 50 ml of pure dry heptane and 25 ml of butyl ethyl magnesium solution were added to the silica and the mixture was stirred for 30 minutes at room temperature.

After standing at rest for 5 minutes, the liquid phase was withdrawn as completely as possible. Unreacted butyl ethyl magnesium was found in the liquid phase. Therefore, an excess of butyl ethyl magnesium solution had been used.

25 ml heptane was then added to the remaining silica composition. After stirring for 15 minutes and settling for 5 minutes, the liquid phase was separated as before. This procedure was repeated three additional times to remove substantially all excess butyl ethyl magnesium.

The washed silica mixture was then dried at room temperature under nitrogen purge, 6.0 ml of pure titanium tetrachloride was added with mixing, and the flask was placed in a bath at a temperature of 134°-136° C. for one hour. The flask was then removed from the bath and the contents cooled to room temperature, followed by addition of 50 ml of pure dry heptane to the contents. The mixture was stirred for 5 minutes and allowed to settle for 5 minutes.

The liquid phase was then separated and found to contain titanium tetrachloride, demonstrating that an excess of titanium tetrachloride had been used in the reaction. Similar washing steps were repeated six times. The remaining solid was of a reddish-violet color, and solvent was evaporated at 60° C. under nitrogen flow until the solid became a free flowing powder. A series of polymerization tests with this catalyst preparation were conducted as described in Example 1, and the results are given in Table II.

EXAMPLE 5

A catalyst was prepared as described in Example 1 except that the catalyst preparation reactions were conducted at room temperature instead of 0° C., and a series of polymerization tests conducted, the results of which are given in Table II. Polyethylene in the form of uniform-sized particles was produced.

TABLE II

| | | Examples 2-5 | | | |
|---|---|---|---|---|---|
| Test No.* | Catalyst Wt. (mg) | Cocatalyst Amount (mmole/g) | Hydrogen (psig) | Reactivity g/g of Ti/hr. | (g/g catalyst/hr.) |
| Test 5 (Example 2) | 18.2 | 9.2 | 50 | 97,700 | 7033 |
| Test 6 (Example 2) | 3.5 | 4.6 | 50 | 91,300 | 6571 |
| Test 7 (Example 3) | 25.7 | 9.2 | 50 | 47,555 | 3424 |
| Test 8 (Example 3) | 16.8 | 9.2 | 50 | 68,000 | 4893 |
| Test 9 (Example 4) | 20.0 | 9.2 | 50 | ** | 7000 |
| Test 10 (Example 4) | 19.5 | 4.6 | 50 | ** | 5900 |
| Test 11 (Example 5) | 15.2 | 9.2 | 50 | 120,600 | 8684 |
| Test 12 (Example 5) | 21.6 | 4.6 | 50 | 114,000 | 8194 |

*Tests Nos. 7-10 (Examples 3 and 4) are results of comparative tests, and Tests Nos. 5-6 and 11-12 are of the catalyst of the invention.
**Because of the use of excess TiCl$_4$ and washing of solvent, the quantity of titanium in the catalyst is unknown.

It can be seen that the use of a pure alkyl magnesium compound (Example 3) results in a catalyst of lower reactivity than catalysts made according to the invention. If costly excesses of a pure alkyl magnesium compound and a titanium compound are used, activity is increased but remains at a level no higher than, and in most cases lower than, the activity of catalysts made according to the invention.

A sample of the polymer formed in Test 11 was melt blended with minor amount of an antioxidant material. An $R_D$ (rheological dispersity) value was obtained on this blend as described in the article by M. Shida and L. V. Cancio in *Polymer Engineering and Science*, Vol. 11, pages 124–128 (1971). The $R_D$ value was 2.6 and the melt index was 0.17. A low $R_D$ value such as 2.6 indicates a narrow molecular weight distribution. Polyethylene resins made with the catalyst of the invention normally have $R_D$ values between about 2.5 to 5.0, and thus generally have narrow molecular weight distributions.

EXAMPLE 6 (COMPARATIVE EXAMPLE)

A catalyst was prepared according to the procedure of Example 1, but without heating of the silica prior to catalyst preparation. In an ethylene polymerization test at 221° F., with 50 psig hydrogen partial pressure and 550 psig total pressure, reactivity was found to be 2445 g/g of solid catalyst/hr. The cocatalyst was triisobutyl aluminum and 9.2 mmoles per gram of solid catalyst was used. The melt index of the particle form polyethylene formed in the reaction was 0.18.

EXAMPLE 7

A catalyst was prepared following the procedure of Example 1 except that the silica was preactivated at 800° C. in a fluidized bed, the magnesium-aluminum complex had a slightly higher magnesium to aluminum ratio, and the concentration of the complex in heptane solution was different. The complex had the formula $\{(C_4H_9)_2Mg\}_{7.5}\{(C_2H_5)_3Al\}$ and the concentration in heptane was 5 weight percent. A 17.55 ml volume of this solution was reacted with 2.7 g of preactivated silica at room temperature for 30 minutes, followed by addition of 0.46 ml of titanium tetrachloride.

After an additional thirty minutes of mixing at room temperature, the solvent was evaporated at 90° C. under nitrogen flow. Portions of the resulting catalyst were used in ethylene polymerization tests at 215° F. with hydrogen additions of 50 and 100 psig, following the procedure of Example 1. 4.6 millimoles of TIBAL per gram of catalyst was used.

The calculated titanium content of this catalyst was 4.7 weight percent and the molar ratio of dibutyl magnesium to titanium tetrachloride was 1.0.

The results given below in Table III show the effect of hydrogen partial pressure in increasing the melt index.

TABLE III

| Catalyst Wt. (mg) | Hydrogen (psig) | Reactivity g/g of Ti/hr. | Reactivity g/g of catalyst/hr. | Melt Index |
|---|---|---|---|---|
| 43.9 | 50 | 133,000 | 6469 | 0.16 |
| 69.9 | 100 | 77,000 | 3615 | 0.45 |

EXAMPLE 8

The catalyst of this example was made according to the procedure of Example 1. However, larger amounts of materials were used and longer times were accordingly required for mixing and evaporation.

An 89.9 g quantity of silica previously dried and preactivated at 600° C. was added to a dry flask under a nitrogen stream and stirred for 5 hours under nitrogen flow at room temperature. A 280 ml volume of $\{(C_4H_9)_2Mg\}_{6.5}\{(C_2H_4)_3Al\}$ in heptane was added to the flask from an addition funnel over a period of one hour. The concentration of the complex solution was 15.8 weight percent.

A 75 ml volume of heptane was then added to the reaction mixture which was then mixed for one hour. The mixture was maintained under nitrogen flow at room temperature for 16 hours, and 50 ml of heptane was added. 25 ml of titanium tetrachloride was then added over a 30 minute period, followed by mixing for two hours at room temperature. Solvent was then evaporated at 90° C. Five hours were required to complete the solvent evaporation.

Polymerization tests were carried out as described in Example 1 with 9.2 millimoles of TIBAL cocatalyst per gram of solid catalyst. Results are set forth below in Table IV. Tests were run at various temperatures between 185° and 221° F. The melt index increased with the reactor temperature demonstrating that product melt index may be controlled by regulation of the polymerization temperature.

TABLE IV

| Reactor Temperature | Hydrogen (psig) | MI | HLMI | HLMI/MI |
|---|---|---|---|---|
| 185° F. | 50 | 0.064 | 2.87 | 45 |
| 215° F. | 50 | 0.24 | 9.45 | 39 |
| 221° F. | 50 | 0.70 | 31.4 | 45 |

EXAMPLE 9

Two catalysts were made by the procedure of Example 5 with a calculated titanium content of 6.1 weight percent and a magnesium to titanium atomic ratio of about 1.0. In one catalyst, the order of addition of the magnesium-aluminum complex and the titanium compound was the same as in Example 5. In the second catalyst, titanium tetrachloride was added to the silica before the magnesium-aluminum complex. Polymerization tests with the catalyst show that the higher reactivity is obtained when the magnesium-aluminum complex is added to the silica before the titanium compound is added. Results are set forth below in Table V. 9.2 millimoles of TIBAL cocatalyst per gram of solid catalyst was used.

TABLE V

| Order of Addition | Catalyst Wt. (mg) | Temp. (°F.) | Hydrogen (psig) | Reactivity g/g catalyst/hr. |
|---|---|---|---|---|
| Magnesium-Aluminum Complex Before TiCl$_4$ (invention) | 16.9 | 217 | 50 | 6400 |
| TiCl$_4$ Before Magnesium-Aluminum Complex (comparison) | 18.2 | 221 | 50 | 1650 |

All parts and percentages herein are by weight.
Abbreviations used herein to identify chemical ingredients and product characteristics include:
HLMI—high load melt index
MI—melt index (ASTM D-1238 52T)
$R_D$—rheological dispersity
TIBAL—triisobutyl aluminum
We claim:
1. An olefin polymerization and copolymerization catalyst active in the presence of an alkyl aluminum cocatalyst prepared by mixing, in the presence of a solvent, reactive materials comprising dry particles of an inorganic oxide having active surface hydroxyl or oxide groups chosen from the group consisting of silica, alumina and silica-alumina, said particles having been preactivated by heating at between about 200° C. and 900° C., and a complex of the general formula $(MgR_2)_m(AlR_3')_n$ where R and R' are alkyl groups and m/n is between about 0.5 and 10, inclusive, to form a reaction mixture of said solvent and a hydrocarbon insoluble first reaction product, and mixing said reaction mixture with a halide, oxyhalide or alkoxyhalide of a metal chosen from the group consisting of titanium, vanadium and zirconium to form a second reaction product, and evaporating said solvent from said second reaction product.

2. An olefin polymerization and copolymerization catalyst active in the presence of an alkyl aluminum cocatalyst, prepared by the consecutive steps of:
  (a) preactivating and drying particles of an inorganic oxide having active surface hydroxyl or oxide groups chosen from the group consisting of silica, alumina and silica-alumina by heating said particles at between about 200° C. and 900° C.;
  (b) reacting said dry particles in the presence of a hydrocarbon solvent with a complex of the general formula $(MgR_2)_m(AlR_3')_n$ wherein R and R' are alkyl groups and m/n is between about 0.5 and 10, inclusive, to form a reaction mixture of said solvent and a first reaction product insoluble in said solvent;
  (c) reacting said first reaction product in said reaction mixture with a halogen-containing transition metal compound to form a second reaction product, said transition metal compound being selected from the group consisting of $Tr(OR'')_aX_{4-a}$ and $TrOX_3$, wherein Tr is a transition metal selected from the group consisting of titanium, vanadium, and zirconium, R'' is an alkyl group of less than about 20 carbon atoms, X is a halogen atom, and a is zero or an integer less than 4; and
  (d) evaporating said solvent from said second reaction product.

3. The catalyst of claim 2 wherein between about 0.6 and 2.5 mmoles of said transition metal compound is present per gram of said inorganic oxide.

4. The catalyst of claim 3 wherein between about 0.25 and 1.0 mmoles of said transition metal compound is present per mmole of said active hydroxyl and oxide groups on said inorganic oxide.

5. The catalyst of claim 3 wherein said transition metal compound is added in equimolar ratio to the total magnesium and aluminum present in said first reaction product.

6. The catalyst of claim 2 wherein m/n is between about 2 and 10.

7. The catalyst of claim 2 wherein said inorganic oxide particles are preactivated by heating at about 600° C.

8. The catalyst of claim 2 wherein said transition metal compound is chosen from the group consisting of $TiCl_4$, $Ti(OR'')Cl_3$, $Ti(OR'')_2Cl_2$, $Ti(OR'')_3Cl$, $VOCl_3$, $VCl_4$ and $ZrCl_4$.

9. The catalyst of claim 2 wherein R has between 2 and 12 carbon atoms.

10. The catalyst of claim 9 wherein R is butyl, R' is ethyl, and m/n is about 6.5.

11. The catalyst of claim 10 wherein said transition metal compound is $TiCl_4$.

12. The method of preparing an olefin polymerization and copolymerization catalyst active in the presence of an alkyl aluminum cocatalyst comprising the consecutive steps of:
  (a) preactivating and drying particles of an inorganic oxide having active surface hydroxyl or oxide groups chosen from the group consisting of silica, alumina and silica-alumina by heating said particles at between about 200° C. and 900° C.;
  (b) reacting said dry particles in the presence of a hydrocarbon solvent with a complex of the general formula $(MgR_2)_m(AlR_3')_n$ wherein R and R' are alkyl groups and m/n is between about 0.5 and 10, inclusive, to form a reaction mixture of said solvent and a first reaction product insoluble in said solvent;
  (c) reacting said first reaction product in said reaction mixture with a halogen-containing transition metal compound to form a second reaction product, said transition metal compound being selected from the group consisting of $Tr(OR'')_aX_{4-a}$ and $TrOX_3$, wherein Tr is a transition metal selected from the group consisting of titanium, vanadium and zirconium, R'' is an alkyl group of less than about 20 carbon atoms, X is a halogen atoms, and a is zero or an integer less than 4; and
  (d) evaporating said solvent from said second reaction product.

13. The method of claim 12 wherein between about 0.6 and 2.5 mmoles of said transition metal compound is present per gram of said inorganic oxide.

14. The method of claim 13 wherein between about 0.25 and 1.0 mmoles of said transition metal compound is present per mmole of said active hydroxyl and oxide groups on said inorganic oxide.

15. The method of claim 13 wherein said transition metal compound is added in equimolar ratio to the total magnesium and aluminum present in said first reaction product.

16. The method of claim 12 wherein m/n is between about 2 and 10.

17. The method of claim 12 wherein said inorganic oxide particles are preactivated by heating at about 600° C.

18. The method of claim 12 wherein said transition metal compound is chosen from the group consisting of $TiCl_4$, $Ti(OR'')Cl_3$, $Ti(OR'')_2Cl_2$, $Ti(OR'')_3Cl$, $VOCl_3$, $VCl_4$ and $ZrCl_4$.

19. The method of claim 12 wherein R has between 2 and 12 carbon atoms.

20. The method of claim 19 wherein R is butyl, R' is ethyl, and m/n is about 6.5.

21. The method of claim 20 wherein said transition metal compound is $TiCl_4$.

* * * * *